Aug. 19, 1958    H. J. HAMJIAN ET AL    2,847,708
MEANS FOR MAKING DIE INSERTS
Filed Aug. 20, 1953

INVENTORS
Harry J. Hamjian
Falih N. Darmara
BY
Hyde, Meyer, Baldwin & Doran
ATTORNEYS

United States Patent Office

2,847,708
Patented Aug. 19, 1958

2,847,708
MEANS FOR MAKING DIE INSERTS

Harry J. Hamjian, Whitesboro, and Falih N. Darmara, New Hartford, N. Y., assignors, by mesne assignments, to Kelsey-Hayes Company, Detroit, Mich., a corporation of Delaware Application August 20, 1953, Serial No. 375,491

4 Claims. (Cl. 18—34)

The invention relates to novel and improved means for making articles directly from comminuted materials, and more particularly to improvements in the art of forming hollow articles having intricate contours on at least one wall thereof. One especially useful adaptation consists in the manufacture of articles, such as defined in the last preceding sentence, from high temperature heat resistant metal powders such as the silicon carbides or mixtures thereof with other suitable refractory metal powders.

The invention will be described and illustrated with specific reference to the manufacture of tubular die inserts for use in lining dies used in powder metallurgy, drawing, or extrusion. In such uses the hardness and wear resistance of cemented carbide makes it most suitable for such severe applications. These die inserts outlast the best alloy steels, often by several hundred fold, and the use of a carbide die, or die insert, is either one of necessity or economics. Although a cemented carbide die or die insert is considerably more expensive than a steel die, the greatly increased service life of the carbide die justifies the much higher price. These carbide die inserts are so expensive that there is a crying need for fabrication techniques to reduce the die cost.

The generally used expedient at present is to form the carbide insert by machining and grinding from a blank. The blank is compressed from powder in a rigid die by conventional carbide pressing technique. No attempt is made to pre-shape the blanks other than by forming them into rounds, squares, or such simple blocks, since the eventual dies are specialized, and not demanded in large quantities of uniform shape, so that the making of pressing dies for pre-shaping a small number of units would be too costly. The fabricator therefore starts from hard sintered blanks, and grinds them to shape.

Most of the dies, or die inserts, have shaped internal cavities, and the most convenient prior method of shaping the internal cavity walls was to form the dies in halves, and grind out the internal walls to the required contours with diamond wheels. The two halves must then be very carefully matched for accurate alignment, then brazed or otherwise retained in said alignment, and set in a steel die block.

The formation of an insert from a carbide block entails a very high machining cost, involving the consumption of considerable time, and wear on tools and equipment. Most of the carbide material is lost as dust, and the diamond tool working surfaces are also worn away. By the time the proper surface contours are achieved the die working surfaces thus formed are less dense, and vary in density, since the density of the sintered blanks is greatest at the surface and decreases towards the center.

An object of the present invention is to provide novel molds and means for preforming hollow inserts having surface contours departing from planar surfaces.

Another object of the invention is to provide means for greatly reducing the cost of fabricating dies or die inserts of the type defined in the last preceding paragraph.

Another object of the invention is to provide novel means for producing die inserts of tubular contour and irregular surface contour, but of even surface hardness throughout.

Another object of the invention is to provide novel means for forming die inserts of dies from compressed, comminuted refractory materials to substantially final shape, whereby to avoid the necessity of any material amount of finish grinding or machining.

Other objects and advantages will be apparent from a study of the following specification, in conjunction with the accompanying drawings, in which.

Figure 2:
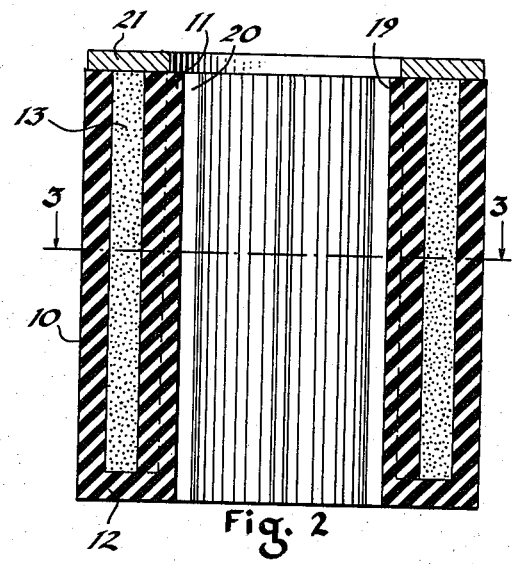
Fig. 2 is a vertical sectional view, greatly enlarged, taken on the line 2—2 of Fig. 1, and showing a suitable mold for forming a die insert in accordance with our invention.
Figure 3:
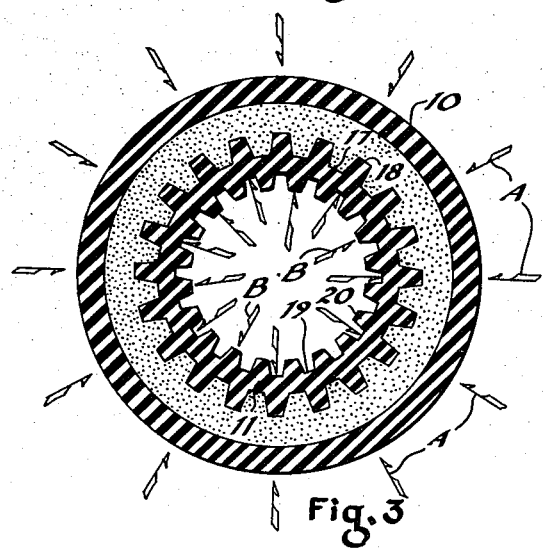
Fig. 3 is a sectional view taken on the line 3—3 of Fig. 2.

Referring first to Figs. 2 and 3 we show a flexible mold consisting of two co-axial cylindrical walls 10 and 11, integrally connected at the base by the transverse, annular wall 12. This structure provides a peripheral molding space 13 between the walls 10 and 11.

In the present instance, since the die insert 14 (Fig. 4) to be formed in the molding space 13, has a series of peripherally spaced longitudinal grooves 15 and lands 16, we form the outer surface of wall 11 with complementary grooves 17 and lands 18. For a purpose later to appear we also form the inner surface of wall 11 with grooves 19 and lands 20.

We now fill the space 13 with comminuted material which in the present described instance is a refractory material. We then place an annular flexible cap 21 over the space 13, holding it in place with any suitable adhesive. It is helpful to place the filled mold in a vacuum chamber and exhaust the majority of the air therefrom before applying the cap, since the presence of occluded air may cause fissures or voids in the finished article.

Figure 1:
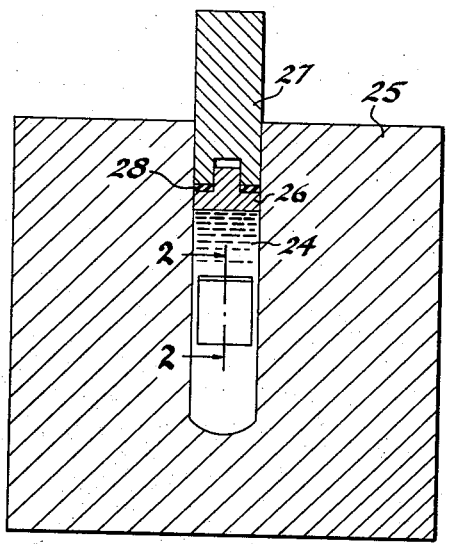
Fig. 1 is a vertical sectional view showing hydraulic pressure applying means for forming our novel die inserts.

The sealed mold is dropped into a dead end bore 24 of a die 25 (Fig. 1) in which there is a hydraulic fluid. Above the fluid is a piston 26 propellable by a plunger 27. Between the plunger and piston is a sealing washer 28.

When heavy pressure is applied to the hydraulic fluid it produces hydrostatic pressure on the yieldable mold and consequently on the comminuted material in the mold. This pressure is effective inwardly (arrows A) and outwardly (arrows B) as best shown in Fig. 3, so as to be evenly effective on the comminuted material through the yieldable walls 10 and 11. The presence of the grooves 19 and the lands 20 on the inner mold periphery complements the lands 18 and grooves 17 on the other side of the wall so as to distribute the hydrostatic pressure evenly to the material. It should be borne in mind that the result of the hydrostatic pressure is to compact the comminuted material, and subsequent sintering produces an additional shrinkage. The combined results of these two factors must be properly appraised in designing the flexible mold. Obviously the original mold cavity is larger than the final article by an amount known to those skilled in the powder metallurgical art.

Figure 4:
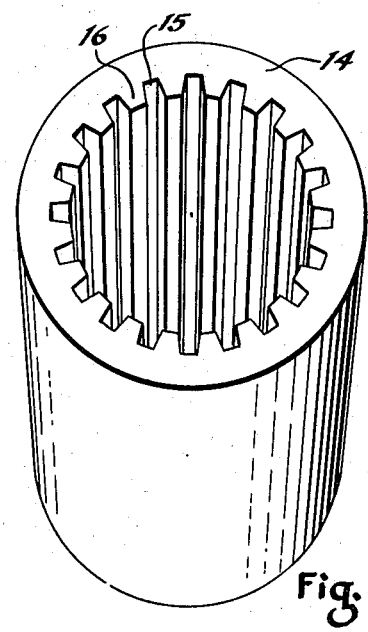
Fig. 4 is a perspective view of the die insert formed in the mold shown in Figs. 2 and 3.

When sufficient pressure has been applied, and maintained for a suitable time, the pressure is relieved by withdrawal of the plunger, the mold is removed, and is stripped from the compressed article, which now appears as shown in Fig. 4. It is then sintered at a suitable temperature whereby a true intermolecular bond is developed between the compressed particles. The article which emerges from the sintering step is an exact replica of the final shape desired.

Figure 5:
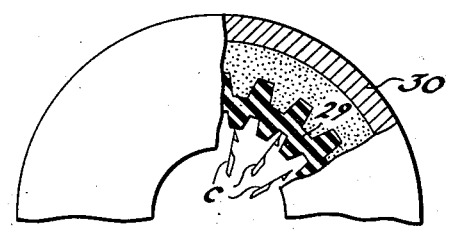
Fig. 5 is a fragmentary sectional view, similar to Fig. 3, but showing a somewhat modified embodiment of the invention.

Fig. 5 shows an embodiment wherein there is a cylindrical wall 29 similar in all respects to the wall 11 of Figs. 2 and 3 instead of an outer flexible wall, however, we provide a steel or other metallic cylindrical shell 30. The powdered material is filled in between walls 29 and 30 as before, the ends are closed to retain the powder, and hydrostatic pressure is applied in the direction of the arrows C. It is possible that by this method the inner periphery of the resulting die may be slightly harder than the outer periphery, but in this instance the inner periphery constitutes the working face of the die, in which case the extra hardness is an advantage. This embodiment shown in Fig. 5 permits the outer wall 30 to be substituted for the die 25 of Fig. 1, although allowing hydrostatic pressure to be effective on only one wall surface.

By the process just described, dies with intricate internal contours can be pressed to shape with maximum surface hardness whereby to improve the quality and reduce the die cost. In addition, after sintering, very little finish grinding is required to bring the die to exact dimensional specifications.

While we have shown and described means for making a die insert in one tubular piece, it could be made as two semi-cylinders to facilitate internal grinding.

If the flexible mold is made from rubber or rubber-like material, its wall thickness should be sufficient to hold a charge of comminuted material without distortion or collapse.

In the manufacture of tubular parts with irregular or intricate internal or external wall contours, tremendous savings may be effected as compared with the cost of the older method of machining or grinding the finished article from a hardened, sintered block. In the embodiment shown in Fig. 3 the wall 10 may be provided with lands or grooves or other contour irregularities, even with undercut portions, if it is desired to form an article with complementary surface contours on its outer wall.

In the appended claims, when we speak of "surface irregularities" we refer to any type of surface indentation or undercutting, of which the grooves and lands in Figs. 2, 3, 4 and 5 are only one illustrative example.

The words "tube," or "tubular," are to be understood as defining not only a structural shape which is cylindrical in inner and outer periphery, but also hollow shapes which are square, or rectangular in cross section, or even other geometrical contours, and the outer and inner peripheral walls need not be of the same contour. It should also be understood that in using the terms "tube" or "tubular" we intend to include hollow shapes which are closed at one end.

What we claim is:

1. A mold for forming an article to finished shape and size from comminuted material, said mold comprising coaxial inner and outer tubular side walls closed at one end by an end wall whereby to define an annular mold cavity for the reception of said comminuted material, each said side wall and said end wall being formed from flexible material, the axial space within said inner wall being open whereby to permit the application of uniform hydrostatic pressure on the outer surfaces of said outer wall and said end wall and on the inner surface of said inner wall so as to subject said comminuted material within said annular mold cavity to an evenly applied compressive force through said side and end walls.

2. A mold as defined in claim 1 wherein means is provided for closing the open end of said annular mold cavity, said means consisting of an annular cap adhesively united to the free ends of said inner and outer walls.

3. A mold as defined in claim 1 wherein the surface of one of said side walls facing said cavity is provided with indentations thereon.

4. A mold as defined in claim 1 wherein both surfaces of one of said side walls are provided with indentations therein.

References Cited in the file of this patent
UNITED STATES PATENTS

| | | |
|---|---|---|
| 1,226,470 | Coolidge | May 15, 1917 |
| 2,024,092 | Cox | Dec. 10, 1935 |
| 2,129,240 | Sandborn | Sept. 6, 1938 |
| 2,169,281 | Pfanstiehl | Aug. 15, 1939 |
| 2,172,243 | Goodnow et al. | Sept. 5, 1939 |
| 2,648,125 | McKenna et al. | Aug. 11, 1953 |
| 2,331,909 | Hensel et al. | Oct. 19, 1943 |
| 2,558,823 | Crowley et al. | July 3, 1951 |
| 2,648,125 | McKenna et al. | Aug. 11, 1953 |